(12) United States Patent
Stegmann et al.

(10) Patent No.: US 8,830,319 B2
(45) Date of Patent: Sep. 9, 2014

(54) DEVICE AND METHOD FOR DETECTING AND DISPLAYING THE REAR AND/OR SIDE VIEW OF A MOTOR VEHICLE

(75) Inventors: Rainer Stegmann, Hoesbach (DE); Peter Krebs, Mömbris (DE)

(73) Assignees: Magna Electronics Europe GmbH & Co. KG, Sailauf (DE); Magna Mirrors Engineering GmbH, Sailauf (DE)

( * ) Notice: Subject to any disclaimer, the term of this patent is extended or adjusted under 35 U.S.C. 154(b) by 361 days.

(21) Appl. No.: 12/990,011

(22) PCT Filed: Apr. 23, 2009

(86) PCT No.: PCT/DE2009/000539
§ 371 (c)(1),
(2), (4) Date: Oct. 28, 2010

(87) PCT Pub. No.: WO2009/132617
PCT Pub. Date: Nov. 5, 2009

(65) Prior Publication Data
US 2011/0043634 A1 Feb. 24, 2011

(30) Foreign Application Priority Data
Apr. 29, 2008 (DE) .......................... 10 2008 021 474

(51) Int. Cl.
*H04N 7/18* (2006.01)
*B60R 1/00* (2006.01)

(52) U.S. Cl.
CPC ............. *B60R 1/00* (2013.01); *B60R 2300/802* (2013.01); *B60R 2300/302* (2013.01); *B60R 2300/303* (2013.01); *B60R 2300/8066* (2013.01); *B60R 2300/8046* (2013.01); *B60R 2300/70* (2013.01)
USPC ........................................................ 348/148

(58) Field of Classification Search
CPC ......... H04N 7/181; H04N 7/183; H04N 7/18; H04N 7/188; H04N 5/217; G08B 13/19656
USPC .................................. 348/148, 118; 382/104
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

| EP | 1077161 A2 | 2/2001 |
| EP | 2077667 A1 | 7/2009 |

(Continued)

*Primary Examiner* — Andy Rao
*Assistant Examiner* — Jared Walker
(74) *Attorney, Agent, or Firm* — Gardner, Linn, Burnkhart & Flory, LLP

(57) ABSTRACT

A device for detecting and displaying the rear and/or side traffic of a motor vehicle is to be improved upon such that the driver can safely and quickly detect the present traffic situation by way of the overall image shown, in particular when the direction of travel is changed. This is accomplished in that the device for detecting and displaying the rear and/or side view of a motor vehicle (1) comprises a first apparatus (3) for producing images of the optically detected rear view (A), one or more further apparatuses (2) for producing images of the optical side view (B,C) of the motor vehicle (1), a display apparatus (6) adapted to display images or image sections of the first and/or the further apparatuses (2, 3) in partial areas (T1, T2), and a control apparatus (5) adapted to select the images or image sections and to assign them to the partial areas (T1, T2). The images or image sections are selected according to the signals of a driving direction indicator (7) and/or the signals of a sensor (8) that represents the steering direction and are assigned to the partial areas (T1, T2). Also provided is a method for detecting and displaying an overall image from an image section or overlapping image sections.

22 Claims, 3 Drawing Sheets

(56) References Cited

U.S. PATENT DOCUMENTS

| | | |
|---|---|---|
| 5,760,962 A | 6/1998 | Schofield et al. |
| 5,796,094 A | 8/1998 | Schofield et al. |
| 5,877,897 A | 3/1999 | Schofield et al. |
| 5,949,331 A | 9/1999 | Schofield et al. |
| 6,222,447 B1 | 4/2001 | Schofield et al. |
| 6,302,545 B1 | 10/2001 | Schofield et al. |
| 6,498,620 B2 | 12/2002 | Schofield et al. |
| 6,523,964 B2 | 2/2003 | Schofield et al. |
| 6,611,202 B2 | 8/2003 | Schofield et al. |
| 6,690,268 B2 | 2/2004 | Schofield et al. |
| 6,717,610 B1 | 4/2004 | Bos et al. |
| 6,802,617 B2 | 10/2004 | Schofield et al. |
| 6,806,452 B2 | 10/2004 | Bos et al. |
| 6,831,261 B2 | 12/2004 | Schofield et al. |
| 6,891,563 B2 | 5/2005 | Schofield et al. |
| 6,953,253 B2 | 10/2005 | Schofield et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,425,076 B2 | 9/2008 | Schofield et al. |
| 7,459,664 B2 | 12/2008 | Schofield et al. |
| 7,561,181 B2 | 7/2009 | Schofield et al. |
| 7,655,894 B2 | 2/2010 | Schofield et al. |
| 2005/0030379 A1 | 2/2005 | Luskin et al. |
| 2005/0049766 A1* | 3/2005 | Tanaka et al. ............... 701/36 |
| 2005/0174429 A1* | 8/2005 | Yanai ............... 348/148 |
| 2005/0190260 A1* | 9/2005 | Xie ............... 348/148 |
| 2007/0165108 A1* | 7/2007 | Yuasa et al. ............... 348/148 |

FOREIGN PATENT DOCUMENTS

| | | | |
|---|---|---|---|
| WO | 2004035352 A1 | 4/2004 | |
| WO | WO 2004035352 A1 * | 4/2004 | ............... B60R 1/08 |
| WO | 20080044589 A1 | 4/2008 | |

* cited by examiner
DEVICE AND METHOD FOR DETECTING AND DISPLAYING THE REAR AND/OR SIDE VIEW OF A MOTOR VEHICLE

FIELD OF THE INVENTION

The present invention relates to a device and a method for sensing and displaying the traffic to the rear and/or side of a motor vehicle.

BACKGROUND OF THE INVENTION

Customary rear view devices which are used in a motor vehicle are mirrors which frequently have regions with differing degrees of convexity. As a result, the driver can better see a blind spot or blind spots. However, the rear view devices are only small in size and the partial region which is additionally formed in the mirror in order to view the blind spot better reduces the available mirror region. As a result, the driver then only has a small partial region for sensing the surroundings to the rear.

Furthermore, camera-supported rear view systems are known which provide both cameras in the lateral exterior mirrors and a central camera to the rear. The image excerpts which are generated by means of the cameras and which represent the surroundings to the side of the motor vehicle and the surroundings to the rear of the motor vehicle are displayed in the passenger compartment of the vehicle, in partial sections of a display arranged one next to the other. With this known solution there is also the problem that a display cannot be made sufficiently large to display all the displayed image excerpts to a sufficient size. The large number of represented image excerpts can additionally serve as a distraction from the image information which is essential for the driver.

SUMMARY OF THE INVENTION

The object of the present invention is to make available a device for sensing and displaying the traffic to the rear and/or side of a motor vehicle, and a method for sensing and displaying a composite image composed of an image excerpt or overlapping image excerpts, which permits the driver to perceive the given traffic situation reliably and quickly on the basis of the represented composite image, in particular when there is a change in the direction of travel.

This object is achieved here by means of the device specified in patent claim 1 and by means of the method specified in patent claim 4 for sensing and displaying the traffic to the rear and/or side of a motor vehicle. In this context, images of different image sensing devices are acquired and a composite image composed of an image excerpt or overlapping image excerpts is subsequently represented on a display apparatus, in particular image excerpts of the region to the rear and side of the motor vehicle. The selection of image excerpts is carried out here in a control apparatus as a function of signals of a travel direction indicator and/or signals of the steering angle which is acquired.

Further advantageous refinements and developments of the according to the invention can be found in the subclaims.

BRIEF DESCRIPTION OF THE DRAWINGS

A preferred embodiment of the system for sensing and displaying the traffic to the rear and/or side of a motor vehicle, and the method according to the invention for sensing and displaying a composite image composed of an image excerpt or overlapping image excerpts, will be described by way of example below, wherein reference is made to the appended drawings for illustrative purposes. In said drawings.

DESCRIPTION OF THE PREFERRED EMBODIMENTS

Figure 1:
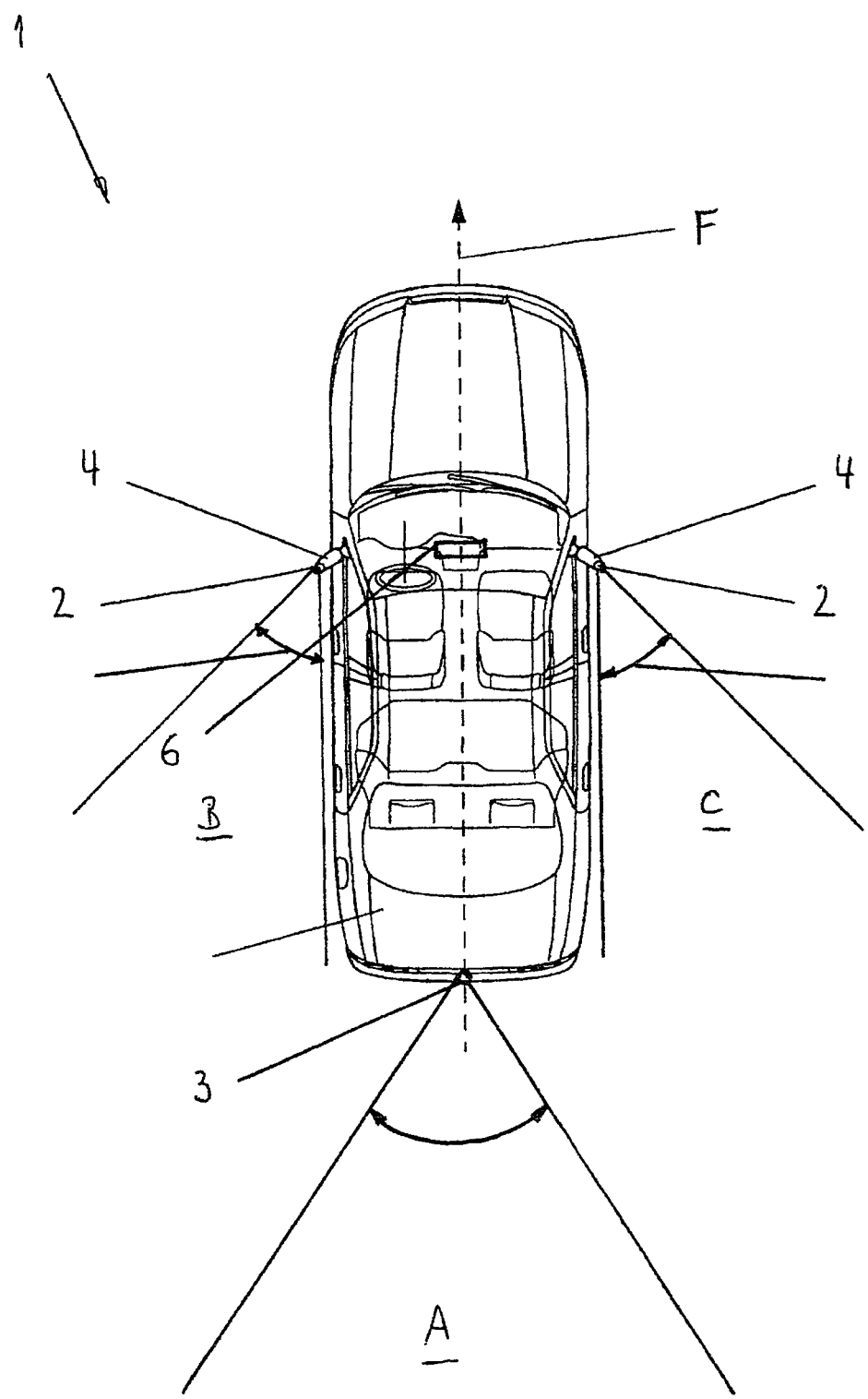
FIG. 1 shows a plan view of a motor vehicle illustrating the arrangement of the apparatuses for generating images of the optically sensed surroundings to the rear and side.

FIG. 1 shows a motor vehicle 1, having a device for sensing and displaying the surroundings to the rear and to the side of the motor vehicle 1. The device which is illustrated and described below provides a driver of the motor vehicle 1 with, with respect to its direction of travel, a view of the surroundings A to the rear of the motor vehicle 1, and when the direction of travel changes a view of the surroundings of the corresponding regions to the side B, C of the motor vehicle 1. This increases safety since when a change of the direction of travel is indicated the driver is provided with a display of the blind spot in the corresponding side region B, C in a correspondingly assigned partial region on the display apparatus.

The device here comprises two apparatuses for generating images of the optically sensed surroundings in the side regions of the motor vehicle which lie opposite one another, referred to below as side image sensing devices 2. The side image sensing devices 2 are preferably cameras which are arranged integrated into the right-hand and left-hand exterior mirrors 4. The cameras can also be arranged at the side regions instead of the exterior mirrors. Furthermore, an apparatus is provided for generating images of the optically sensed surroundings of the surroundings to the rear, referred to below as central rear view sensing device 3. This rear view sensing device 3 is preferably a camera which can be arranged in the region of the bumper to the rear or else in the internal roof lining in the passenger compartment. All the abovementioned cameras are directed to the rear in the direction of travel which is indicated by the arrow F or are arranged toward the rear rotated through an angle with respect to the direction of travel. The device according to the invention also comprises a control apparatus 5 in which the images generated by the abovementioned image sensing devices 2, 3 are transmitted. A display apparatus 6, which is illustrated schematically in the plan view as a rectangular display in the front upper region of the windshield, serves for displaying, over a surface, a composite image composed of an image excerpt or a plurality of assembled image excerpts. For this purpose, the display apparatus 6 can be divided into partial regions which may be variable in terms of their horizontal extent. In the case of the described exemplary embodiment, the display is divided into partial regions which are arranged laterally one next to the other. In the left-hand partial region, it is possible here to represent images or image excerpts of the side camera arranged on the left-hand side. In the region of the display which remains to the right thereof, an image excerpt of the central camera is then added in a seamless fashion to the boundary region of the left-hand partial region. In the right-hand partial region T1 it is possible to represent image excerpts of the camera arranged on the right-hand side, then an image excerpt of the central camera will be added here in a seamless fashion to the boundary region G of the right-hand partial region in the remaining partial region T2 of the display on the left-hand side. The partial regions are represented here as a function of image excerpts which are selected in the control apparatus 5. In this context, both the selection of the images or image excerpts and the assignment to the corresponding partial regions of the display apparatus 6 are performed in the control apparatus 5.

The selection of the images or image excerpts is carried out here as a function of a signal of a travel direction indicator 7 and/or as a function of a signal of a steering angle sensor 8. The representation of the image excerpts on the display apparatus produces a seamless composite image for the driver here. This is shown by the illustrations in FIGS. 2 and 3. In order to obtain a seamless image which is composed of overlapping image excerpts, what are referred to as matching methods are used. Known matching methods are frequently based on the least mean square method. However, it is also possible to use all known methods.

Figure 2:
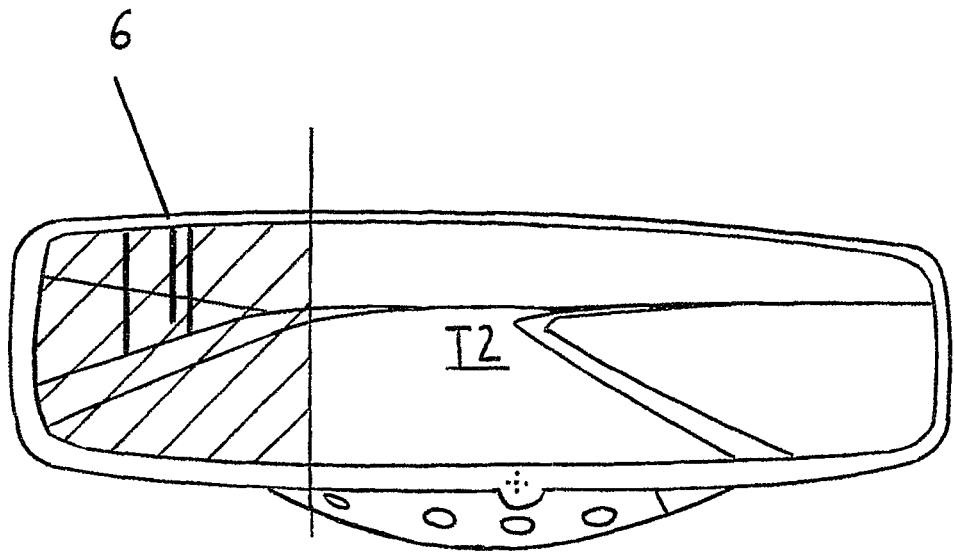
FIG. 2 shows a display apparatus with the representation of the image generated by the central rear view sensing device.

FIG. 2 shows the illustration of the display apparatus for the driver during travel in the longitudinal direction of the motor vehicle. The steering angle is 0 degrees here, and the travel direction indicator is in its neutral central position. In this travel situation, the image generated by the central rear view sensing device 3 is presented to the driver on the display of the display apparatus 6. In this context, the entire available display region is utilized as partial region T2 for representation.

Figure 3:
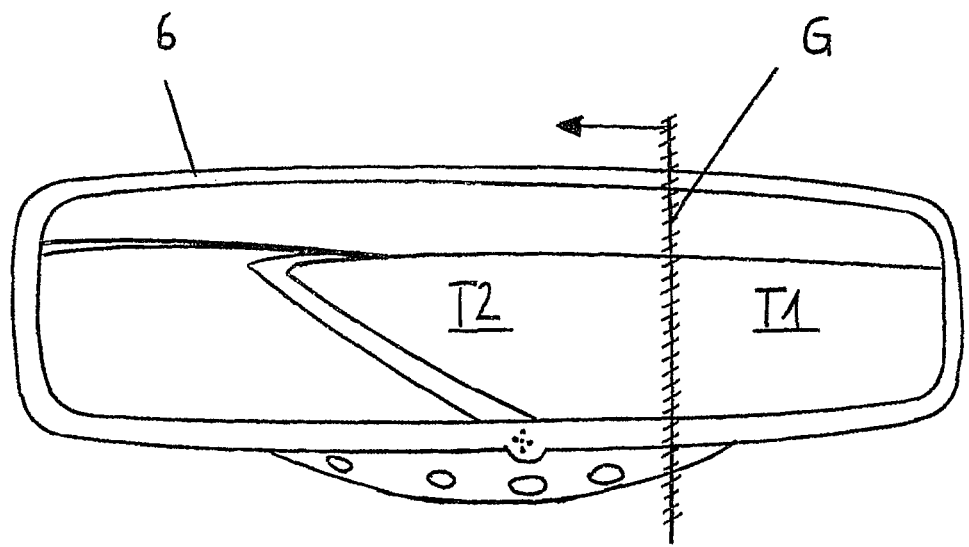
FIG. 3 shows a display apparatus with the representation of a seamless composite image which is made up from an image excerpt of the central rear view sensing device and of the right-hand side image sensing device.
Figure 4:
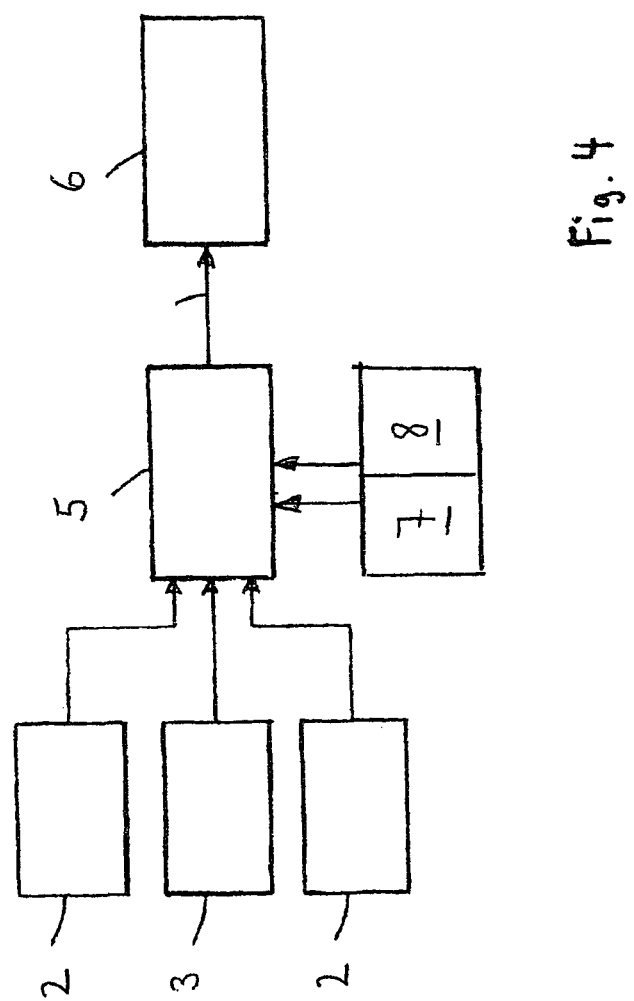
FIG. 4 shows a block diagram representing the method according to the invention.

FIG. 3 shows the illustration of the display apparatus for the driver when the travel direction indicator is activated to the right. The steering angle is also zero, and the sensor 7 which is assigned to the travel direction indicator supplies the control apparatus 5 with the corresponding signal (change of direction of travel to the right). In the control apparatus 5, the generated image excerpts of the right-hand side region C are then combined with the image excerpts of the surroundings A to the rear and represented as a seamless image on the display apparatus. As can be seen from the illustration in FIG. 3, the image excerpt of the right-hand surroundings C to the side is represented in the right-hand partial region T1 of the display, and an image excerpt of the image of the central rear view sensing device 3 is presented on the left-hand side of the display, in the remaining partial region T2 of the display. The represented composite image is therefore shifted to the left for the viewer compared to the representation in FIG. 2. As a result, the driver is presented with a representation of the right-hand side region C and can view the blind spot on the display. The left-hand region of the image of the central camera, which is uninteresting for the driver in respect of this travel situation "migrates" out of the display (region with hatching in FIG. 2).

In a subsequent turning-off process or lane change, the signals which are acquired by the steering angle sensor 8 are additionally used in the control apparatus 5 to select the image excerpts and for the assignment of the partial regions T1 and T2. Depending on the steering angle, the partial regions T1/T2 are made larger or smaller here. This provides a dynamic composite image which is composed of image sections with dynamically adaptive variables. In the illustrated example, the composite image would be shifted dynamically to the left for the viewer as the steering angle becomes larger (boundary region G is shifted to the left). This means that the left-hand partial region T2 becomes dynamically smaller in its horizontal extent as the steering angle becomes larger, and the right-hand partial region T1 is made larger by this amount.

Previously described explanations about the assembled image excerpts during the rightward change of direction of travel and during the subsequent steering process to the right apply correspondingly to the displaying of the change of the direction of travel to the left and during the subsequent steering process to the left. The left-hand lateral surroundings of the motor vehicle are presented as an image excerpt in a left-hand partial region on the display, and during the steering process the left-hand partial region is displaced and the composite image is therefore displaced to the right for the viewer.

The invention claimed is:

1. A device for sensing and displaying the surroundings at the rear and sides of a motor vehicle, said device comprising:
   a first apparatus for generating images of the optically sensed surroundings rearward of the motor vehicle, wherein said first apparatus comprises a first camera disposed at a rear portion of the motor vehicle, and wherein said firs camera is generally centrally located at the rear portion of the motor vehicle;
   second and third apparatuses for generating images of the optical surroundings at first and second sides of the motor vehicle, respectively, wherein said second apparatus comprises a second camera disposed at an exterior rearview mirror assembly at the first side of the motor vehicle and wherein said third apparatus comprises a third camera disposed at an exterior rearview mirror assembly at the second side of the motor vehicle;
   a display apparatus operable to display images generated by the first apparatus and the second and third apparatuses at respective center, first side and second side partial regions of a display screen of the display apparatus;
   a control apparatus operable to select and assign the images to the respective center partial region, first side partial region and second side partial region;
   wherein, during forward travel of the motor vehicle, the control apparatus is operable to vary the horizontal extents of the partial regions and respective displayed images responsive to signals of a sensor that represent the steering angle of the motor vehicle;
   wherein, during forward travel of the motor vehicle, the images are selected and the images are assigned to and displayed at the respective partial regions of the display screen as a function of (i) a signal of a travel direction indicator and (ii) a signal of a sensor which represents the steering angle of the motor vehicle;
   wherein, during forward travel of the motor vehicle, the horizontal extents of the partial regions are dynamically adjusted according to the steering angle in order to display a dynamic composite seamless image which is composed of image sections with dynamically adaptive horizontal extents;
   wherein, during forward travel of the motor vehicle, at least the first side partial region and second side partial region are varied in their horizontal extents responsive to a change in the steering angle, and wherein the degree of variation of their horizontal extents is a function of a degree of chance in the steering angle of the motor vehicle;
   wherein the displayed images at adjacent partial regions are merged together in such a way that the displayed dynamic composite seamless image has seamless transitions in the boundary regions; and
   wherein, during forward travel of the motor vehicle, and as the steering angle to the first side of the motor vehicle increases, the horizontal extent of the image displayed at the first side partial region increases and the horizontal extent of the image displayed at the second side partial region decreases, and wherein the degree of variation of the horizontal extent of the images displayed at the first side partial region increases as a function of a degree of change in the steering angle of the motor vehicle and wherein the degree of variation of the horizontal extent of the images displayed at the second side partial region decreases as a function of a degree of change in the steering angle of the motor vehicle.

2. The device for sensing and displaying the surroundings at the rear and sides of a motor vehicle as claimed in claim 1, wherein the partial regions are displayed one next to the other on the display screen of the display apparatus.

3. The device for sensing and displaying the surroundings at the rear and sides of a motor vehicle as claimed in claim 1, wherein, as the steering angle to the second side of the motor vehicle increases, the horizontal extent of the image displayed at the second side partial region increases and the horizontal extent of the image displayed at the first side partial region decreases.

4. A method for sensing and displaying the surroundings at the rear and sides of a motor vehicle, said method comprising:
    a first step, wherein, in the first step, images of the surroundings to the rear and sides of the motor vehicle are acquired via a central rear view sensing device and opposite side sensing devices;
    a further step, wherein, in the further step, and during forward travel of the motor vehicle, one or more of the acquired images are selected and displayed on a display apparatus in partial regions;
    wherein signals of a travel direction indicator and signals which represent the steering angle are acquired and the images are selected as a function of the acquired signals and the images are assigned to the partial regions;
    wherein, during forward travel of the motor vehicle, the partial regions are variable in terms of their horizontal extent depending on the steering angle in order to provide a dynamic composite seamless image which is composed of images displayed at partial regions with dynamically adaptive horizontal extents, and wherein the degree of variation of the horizontal extents of the partial regions and displayed images is a function of a degree of change in the steering angle of the motor vehicle; and
    wherein, during forward travel of the motor vehicle, and as the steering angle to the first side of the motor vehicle increases, the horizontal extent of the displayed image generated by said camera at a first side of the motor vehicle and its respective first side partial region increases and the horizontal extent of the displayed image generated by said camera at a second side of the motor vehicle and its respective second side partial region decreases, and wherein the degree of variation of the horizontal extent of the image displayed at the first side partial region increases as a function of a degree of change in the steering angle of the motor vehicle and wherein the degree of variation of the horizontal extent of the image displayed at the second side partial region decreases as a function of a degree of change in the steering angle of the motor vehicle.

5. The method for sensing and displaying the surroundings at the rear and sides of a motor vehicle as claimed in claim 4, wherein, in a travel situation in which the signals of the travel direction indicator indicate a neutral position and the steering angle is zero degrees, the image of the surroundings at the rear, which is generated by the central rear view sensing device, is represented in a partial region on the display apparatus, and the partial region covers the entire display apparatus.

6. The method for sensing and displaying the surroundings at the rear and sides of a motor vehicle as claimed in claim 4, wherein, in a travel situation in which the signals of the travel direction indicator indicate a change in the direction of travel towards the first side of the motor vehicle and the steering angle is zero degrees, the image of the surroundings at the first side of the motor vehicle, which is assigned to the determined direction of travel, is displayed at the first side partial region, and the image of the surroundings at the rear is displayed at another partial region.

7. The method for sensing and displaying the surroundings at the rear and sides of a motor vehicle as claimed in claim 6, wherein, in a travel situation in which signals of the steering angle which are unequal to zero degrees are sensed, the sizes of the partial regions are changed as a function of the signals of the steering angle.

8. The method for sensing and displaying the surroundings at the rear and sides of a motor vehicle as claimed in claim 4, wherein the images displayed at adjacent partial regions are joined together in such a way that they are displayed as a composite image having a seamless transition in their boundary regions.

9. The method for sensing and displaying the surroundings at the rear and sides of a motor vehicle as claimed in claim 5, wherein the images displayed at adjacent partial regions are joined together in such a way that they are displayed as a composite image having a seamless transition in their boundary regions.

10. The method for sensing and displaying the surroundings at the rear and sides of a motor vehicle as claimed in claim 6, wherein the images displayed at adjacent partial regions are joined together in such a way that they are displayed as a composite image having a seamless transition in their boundary regions.

11. The method for sensing and displaying the surroundings at the rear and sides of a motor vehicle as claimed in claim 7, wherein the images displayed at adjacent partial regions are joined together in such a way that they are displayed as a composite image having a seamless transition in their boundary regions.

12. A device for sensing and displaying the surroundings at the rear and sides of a motor vehicle, said device comprising:
    a first apparatus for generating images of the optically sensed surroundings to the rear of a motor vehicle equipped with the device;
    two or more further apparatuses for generating images of the optical surroundings at the sides of the motor vehicle;
    a display apparatus operable to display images generated by the first apparatus and the further apparatuses in respective partial regions of a display screen of said display apparatus;
    a control apparatus operation to select the images and assign them to respective partial regions;
    wherein the images are selected and assigned as a function of (i) the signals of a travel direction indicator and (ii) the signals of a sensor which represent the steering angle, and wherein, during forward travel of the motor vehicle, said images and their respective partial regions are variable in terms of their horizontal extent depending on the steering angle in order to display a dynamic composite seamless image comprising image sections with dynamically adaptive horizontal extents;
    wherein said first apparatus comprises a rear image sensing camera disposed at a rear portion of the motor vehicle;
    wherein one of said two or more further apparatuses comprises a first side image sensing camera integrated into the right-hand exterior mirror of the motor vehicle and wherein another of said two or more further apparatuses comprises a second side image sensing camera integrated into the left-hand exterior mirror of the motor vehicle;

wherein said images assigned to a central partial region are generated by said first apparatus and wherein said images assigned to a first side partial region are generated by said first side image sensing camera and wherein said images assigned to a second side partial region are generated by said second side image sensing camera;

wherein, during forward travel of the motor vehicle, at least the first side and second side partial regions change in their horizontal extents as a function of the size of the steering angle, and wherein a degree of variation other horizontal extents is a function of a degree of change in the steering angle of the motor vehicle; and wherein, during forward travel of the motor vehicle, and as the steering angle to the first side of the motor vehicle increases, the horizontal extent of the image generated by said first side image sensing camera and displayed at the first side partial region increases and the horizontal extent of the image generated by said second side image sensing camera and displayed at the second side partial region decrease, and wherein the degree of variation of the horizontal extent of the image displayed at the first side partial region increases as a function of a degree of change in the steering angle of the motor vehicle and wherein the degree of variation of the horizontal extent of the image displayed at the second side partial region decreases as a function of a degree of change in the steering angle of the motor vehicle.

13. The device for sensing and displaying the surroundings at the rear and sides of a motor vehicle as claimed in claim 12, wherein said rear image sensing camera is disposed at a region of the bumper at the rear of the motor vehicle.

14. The device for sensing and displaying the surroundings at the rear and sides of a motor vehicle as claimed in claim 13, wherein, when the motor vehicle is traveling in the longitudinal direction with the steering angle at around zero degrees and with the travel direction indicator in its neutral central position, an image generated by said first apparatus is displayed to the driver on the display of the display apparatus, and wherein, when the travel direction indicator is activated to the right by the driver of the motor vehicle, an image generated by said first side image sensing camera integrated into the right-hand exterior mirror of the motor vehicle is displayed to the driver on the display of the display apparatus to the right of said image generated by said first apparatus.

15. The device for sensing and displaying the surroundings at the rear and sides of a motor vehicle as claim in claim 14, wherein the horizontal extent of the displayed image generated by said first side image sensing camera integrated into the right-hand exterior mirror of the motor vehicle increases as the steering angle to the right of the motor vehicle increases.

16. The device for sensing and displaying the surroundings at the rear and sides of a motor vehicle as claimed in claim 15, wherein the horizontal extent of the image generated by said first apparatus decreases as the steering angle to the right of the motor vehicle increases.

17. The device for sensing and displaying the surroundings at the rear and sides of a motor vehicle as claimed in claim 4, wherein said images are displayed in a seamless fashion.

18. The device for sensing and displaying the surroundings at the rear and sides of a motor vehicle as claimed in claim 17, wherein said display apparatus is located in the front upper region of the windshield of the motor vehicle.

19. The device for sensing and displaying the surroundings to the rear and/or side of a motor vehicle as claimed in claim 14, wherein said display apparatus comprises a part of an interior rearview mirror assembly.

20. The method for sensing and displaying the surroundings at the rear and sides of a motor vehicle as claimed in claim 8, wherein said images are displayed in a seamless fashion.

21. The device for sensing and displaying the surroundings at the rear and sides of a motor vehicle as claimed in claim 17, wherein said rear image sensing camera is arranged at a region of the bumper at the rear of the motor vehicle and wherein, when the motor vehicle is traveling in the longitudinal direction with the steering angle at around zero degrees and with the travel direction indicator in its neutral central position, an image generated by said first apparatus is displayed to the driver on the display of the display apparatus, and wherein, when the travel direction indicator is activated to the right by the driver of the motor vehicle, an image generated by said first side image sensing camera integrated into the right-hand exterior mirror of the motor vehicle is displayed to the driver on the display of the display apparatus to the right of said image generated by said first apparatus, and wherein the horizontal extent of said image generated by said first side image sensing camera integrated into the right-hand exterior mirror of the motor vehicle increases as the steering angle to the right of the motor vehicle increases and wherein the horizontal extent of said image generated by said first apparatus decreases as the steering angle to the right of the motor vehicle increases.

22. The method for sensing and displaying the surroundings at the rear and sides of a motor vehicle as claimed in claim 4, wherein said display apparatus is located in the front upper region of the windshield of the motor vehicle and wherein said display apparatus comprises a part of an interior rearview mirror assembly.

* * * * *

UNITED STATES PATENT AND TRADEMARK OFFICE
CERTIFICATE OF CORRECTION

PATENT NO.        : 8,830,319 B2
APPLICATION NO.   : 12/990011
DATED             : September 9, 2014
INVENTOR(S)       : Rainer Stegmann et al.

It is certified that error appears in the above-identified patent and that said Letters Patent is hereby corrected as shown below:

On the Title Page:

(74) Attorney, Agent, or Firm – "Gardner, Linn, Burnkhart & Flory, LLP" should be
--Gardner, Linn, Burkhart & Flory, LLP--

In the Claims:

Column 4
Line 16, Claim 1, "firs" should be --first--
Line 55, Claim 1, "chance" should be --change--

Column 6
Line 53, Claim 12, "operation" should be --operable--

Column 7
Line 15, Claim 12, "other" should be --of the--
Line 25, Claim 12, "decrease" should be --decreases--
Line 51, Claim 15, "claim" should be --claimed--

Column 8
Line 10, Claim 17, "4" should be --12--

Signed and Sealed this
First Day of September, 2015

Michelle K. Lee
*Director of the United States Patent and Trademark Office*